May 5, 1953 J. S. KILBY ET AL 2,637,777

ELECTRICAL NETWORK HAVING DISTRIBUTED CAPACITANCE

Filed Feb. 27, 1950

INVENTORS
JACK S. KILBY
BY ALFRED S. KHOURI

John W. Michael
ATTORNEY

Patented May 5, 1953

2,637,777

UNITED STATES PATENT OFFICE 2,637,777

ELECTRICAL NETWORK HAVING DISTRIBUTED CAPACITANCE

Jack S. Kilby and Alfred S. Khouri, Milwaukee, Wis., assignors to Globe-Union Inc., Milwaukee, Wis., a corporation of Delaware Application February 27, 1950, Serial No. 146,592

1 Claim. (Cl. 178—44)

This invention relates to improvements in small unitary electrical networks having resistance and distributed capacitance. Such networks have properties of both T and pi section filters and are capable of attenuation, phase shift, time delay, and other uses.

Such units usually have a network of two conductive plates forming a capacitance and a resistor, or other diverse impedance element, mounted on a dielectric body providing the support. The use of two conductive plates cuts down the amount of surface on the dielectric body available for supporting the resistance and also lumps the capacitance. The filter action is therefore not of the highest quality.

It is an object, therefore, of this invention to provide a small unitary network having resistance and distributed capacitance in which there is more space than heretofore on the dielectric available for supporting a resistance or other impedance element.

Another object is to provide a small unitary network having a resistance and capacitance the filter action of which is of higher quality than that heretofore attained.

These objects are obtained by using a base of ceramic or other high dielectric constant material and applying a good conductive member to one side thereof and a poor conductive member on the other side. The poor conductive member has two leads and acts both as the resistance element and as a plate of the capacitance. The space on the dielectric saved by eliminating a conductive plate and utilizing the resistance element as such plate permits the use of a resistor of greater area which has inherently lower noise characteristics. The use of the resistance as a plate of the capacitor more widely distributes the capacitance throughout the network and this increases the quality of the filter action.

The novel features, which are considered characteristic of the invention, are set forth with particularity in the appended claim. The invention itself, however, both as to its organization and its method of operation, together with additional objects and advantages thereof, will best be understood from the following description of specific embodiments when read in connection with the accompanying drawing, in which:

Figure 1:
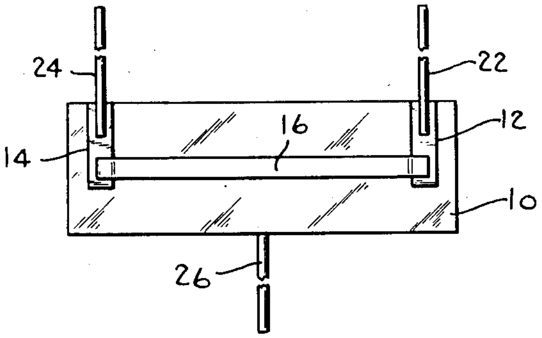
Fig. 1 is a front plan view of a unitary network embodying the present invention.
Figure 2:
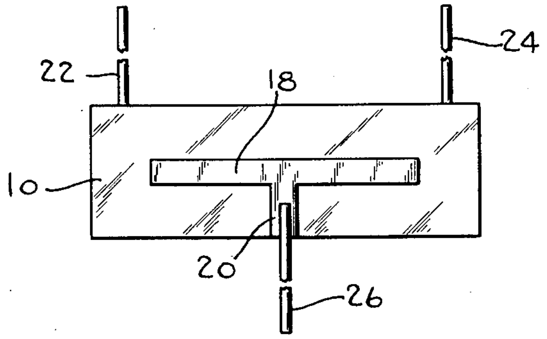
Fig. 2 is a rear plan view of such unitary network.
Figure 3:
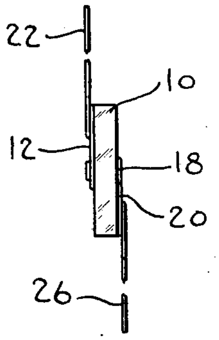
Fig. 3 is a righthand end view of such network.

Referring to the drawing by reference numerals, the unit disclosed employs a network which has the properties of both T and pi section filters. The network is mounted on a base plate 10 made of ceramic material having a high dielectric constant in the neighborhood of three thousand. The base plate is very small having a length of an inch or under and a width of a half inch or under. A pair of relatively small conductive plates 12 and 14 are applied to the front surface of the base plate 10 near the corners thereof to provide end areas for the resistor to which leads may be soldered. These plates must be placed so that the capacity between them and the silvered area on the other side is negligible. A resistor 16 is also applied to the front face and to such end areas 12 and 14 so that such resistor may be connected in an electrical circuit. On the rear face of the plate 10 there is applied a conductive plate 18 substantially as large in area as and in juxtaposition with the resistor 16. This plate has a narrow portion 20 which extends toward an edge of the plate 10 to provide an area to which a lead may be connected.

The conductive plates 12, 14, and 18 are applied by the stencil-screen process by which conductive material containing silver is applied to the ceramic and then fired to bond such plates to the ceramic base plate 10. The resistor 16 is applied in the form of paint containing carbon which is screened onto the surface of the dielectric member 10 and the end areas 12 and 14. Ribbon-type leads 22, 24, and 26 are soldered respectively to the conductive plates 12, 14, and 20 to make it convenient to connect the network in a system. The unit may be covered with a protective coating (not shown).

Figure 4:
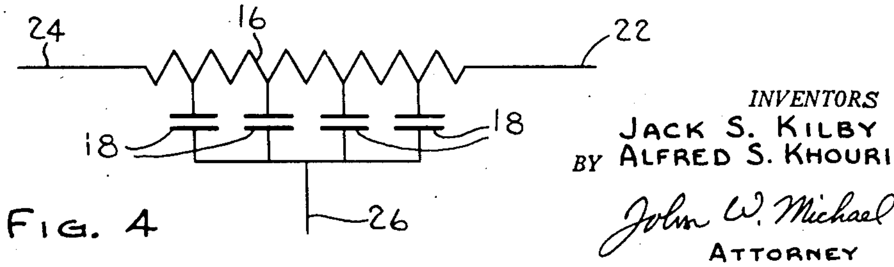
Fig. 4 is a schematic diagram of the electronic circuit of such unit.

The resistor 16 also acts as a plate of the capacitance which is formed between it and the conductive plate 18. The capacitance relationship between these elements takes place substantially along the length of each and is diagrammatically illustrated by the plurality of capacitances as shown in Fig. 4. Thus the capacitance is distributed uniformly throughout the network and tests show that this makes the filter action of the unit of extremely high quality. Because the face of the dielectric body to which the resistor 16 is applied does not have to provide space for an additional conductive area which acts as the other plate of the capacitor, the resistor may be made longer without increasing the size of the plate 10. Because of this additional length the paint which forms the resistor may have lower resistance charatceristics and consequent lower noise characteristics without lessening the total resistance. This is an important factor in filter units.

It is possible and practical to use two resistors and four leads. In such modification the conductive plate 18 and its lead 26 on the back face of plate 10 is replaced by a resistor and two leads identical with those shown on the front face and in Fig. 1 with the exception that the conductive end areas and leads would extend in the opposite direction from those on the front face.

Although only several embodiments of the invention are shown and described herein, it will be understood that this application is intended to cover such other changes or modifications as come within the spirit of the invention or scope of the following claim.

We claim:

A small electrical network having resistance and distributed capacitance comprising a very small, flat, high dielectric constant ceramic base plate, a pair of spaced, relatively small conductive areas bonded to one face of said plate at opposite ends thereof, a pair of leads connected to said conductive areas, a relatively large area fixed resistor applied in the form of paint containing carbon to said face of said plate and extending from one to the other of said conductive areas, a conductive plate applied to the other face of said base plate and in juxtaposition with said resistor, said plate being shorter than the distance between said conductive areas so as not to establish any appreciable capacitance coupling between said plate and said areas, and a single lead connected to said conductive plate whereby said conductive plate and said resistor form a capacitor using said base plate as the dielectric thereof.

JACK S. KILBY.
ALFRED S. KHOURI.

References Cited in the file of this patent

UNITED STATES PATENTS

| Number | Name | Date |
|---|---|---|
| 2,126,915 | Norton | Aug. 16, 1938 |
| 2,464,377 | Cohen et al. | Mar. 15, 1949 |
| 2,523,856 | Baker | Sept. 26, 1950 |

OTHER REFERENCES

Publication: "New Advances in Printed Circuits," National Bureau of Standards Miscellaneous Publication 192, issued Nov. 22, 1948. For sale by Supt of Documents, Washington 25, D. C., 40 cents. See pages 10–14. (Copy in Div. 69.)